US012646030B2

(12) United States Patent
Mesard et al.

(10) Patent No.: US 12,646,030 B2
(45) Date of Patent: Jun. 2, 2026

(54) USING A TRAINED MODEL OF AN ONLINE SYSTEM TO GENERATE ACTION RECOMMENDATIONS BY PREDICTING FUTURE DEMAND

(71) Applicant: Maplebear Inc., San Francisco, CA (US)

(72) Inventors: Madeline Mesard, New York, NY (US); Brent Scheibelhut, Toronto (CA); Charles Wesley, San Diego, CA (US); Mark Oberemk, Toronto (CA)

(73) Assignee: Maplebear Inc., San Francisco, CA (US)

( * ) Notice: Subject to any disclaimer, the term of this patent is extended or adjusted under 35 U.S.C. 154(b) by 122 days.

(21) Appl. No.: 18/629,511

(22) Filed: Apr. 8, 2024

(65) Prior Publication Data

US 2025/0315781 A1     Oct. 9, 2025

(51) Int. Cl.
*G06Q 10/087* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC ............ G06Q 10/087; G06Q 30/0202; G06Q 10/0872; G06Q 10/08724; G06Q 10/08728
See application file for complete search history.

(56) References Cited

U.S. PATENT DOCUMENTS 11,574,325 B1 * 2/2023 Yuan .................. G06Q 30/0202

* cited by examiner

*Primary Examiner* — Ariel J Yu
*Assistant Examiner* — Denisse Y Ortiz Roman
(74) *Attorney, Agent, or Firm* — Fenwick & West LLP

(57) ABSTRACT

A trained model of an online system is used to generate action recommendations by predicting future demands. The online system gathers in-store data by receiving, from a device of a picker and/or a computing system of an in-store physical receptacle, data with information about an inventory of an item. The online system estimates, based on conversion data for the item, a level of inventory for the item. The trained model is then applied to predict, based on the in-store data and the estimated level of inventory, a demand prediction score indicative of a future demand for the item. The online system generates, based on the estimated level of inventory and the demand prediction score, a depletion metric indicative of a time period until the inventory of the item is depleted. Based on the depletion metric, the online system triggers an action in relation to the inventory of the item.

19 Claims, 6 Drawing Sheets

Smart Shopping Cart
150

500

| Item ID | Current Inventory (via inventory prediction model) | Demand Prediction Score (via demand prediction model) | Days Until Depletion | Inventory Purchase Recommendation |
|---------|-----|------|----|-----|
| A | 20 | 10% | 10 | N/A |
| B | 45 | 75% | 3 | 30 |
| C | 1000 | 105% | 0 | 500 |

FIG. 5

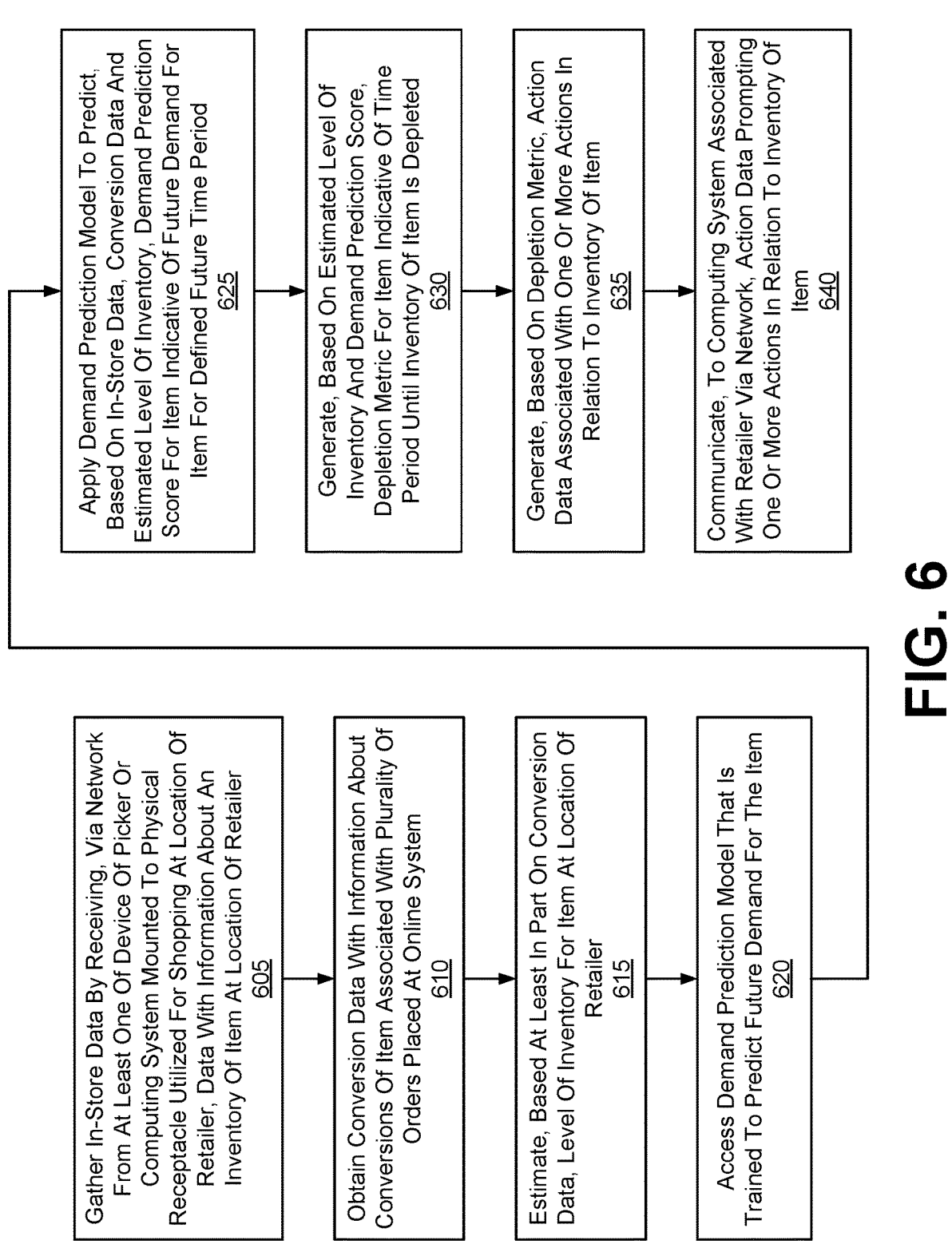

Gather In-Store Data By Receiving, Via Network From At Least One Of Device Of Picker Or Computing System Mounted To Physical Receptacle Utilized For Shopping At Location Of Retailer, Data With Information About An Inventory Of Item At Location Of Retailer
605

Obtain Conversion Data With Information About Conversions Of Item Associated With Plurality Of Orders Placed At Online System
610

Estimate, Based At Least In Part On Conversion Data, Level Of Inventory For Item At Location Of Retailer
615

Access Demand Prediction Model That Is Trained To Predict Future Demand For The Item
620

Apply Demand Prediction Model To Predict, Based On In-Store Data, Conversion Data And Estimated Level Of Inventory, Demand Prediction Score For Item Indicative Of Future Demand For Item For Defined Future Time Period
625

Generate, Based On Estimated Level Of Inventory And Demand Prediction Score, Depletion Metric For Item Indicative Of Time Period Until Inventory Of Item Is Depleted
630

Generate, Based On Depletion Metric, Action Data Associated With One Or More Actions In Relation To Inventory Of Item
635

Communicate, To Computing System Associated With Retailer Via Network, Action Data Prompting One Or More Actions In Relation To Inventory Of Item
640

FIG. 6

USING A TRAINED MODEL OF AN ONLINE SYSTEM TO GENERATE ACTION RECOMMENDATIONS BY PREDICTING FUTURE DEMAND

BACKGROUND

Inventory management is a difficult task, as manually checking inventory and maintaining efficient inventory levels are burdensome and not feasible on a large scale. The inventory management is an especially difficult task for infrequently purchased items, seasonal or trending items, as well for keeping track of different locations of items in a store. Currently, retailers have limited feedback for item inventory models, especially for less frequently purchased items. For example, there may be a decrease in demand causing no purchases for some period of time, so retailers may not immediately realize that certain items are out-of-stock and may be missing out on the future demand. Also, the demand can change quickly, and retailers typically do not have real-time feedback on a current level of inventory. Therefore, there is a technical problem of how to implement inventory management in an automatic manner on a large scale without the requirement of a manual process.

SUMMARY

Embodiments of the present disclosure are directed to using a trained model of an online system (e.g., online concierge system) to generate action recommendations for retailers associated with the online system by predicting future demands of items offered by the retailers. Based on the action recommendations, the retailers can resupply their inventories before depletion of items.

In accordance with one or more aspects of the disclosure, the online system gathers in-store data by receiving, via a network from at least one of a device of a picker associated with an online system or a computing system mounted to a physical receptacle utilized for shopping at a location of a retailer associated with the online system, data with information about an inventory of an item at the location of the retailer. The online system obtains conversion data with information about conversions of the item associated with a plurality of orders placed at the online system. The online system estimates, based at least in part on the conversion data, a level of inventory for the item at the location of the retailer. The online system accesses a demand prediction model of the online system, wherein the demand prediction model is trained to predict a future demand for the item. The online system applies the demand prediction model to predict, based on the in-store data, the conversion data and the estimated level of inventory, a demand prediction score for the item indicative of the future demand for the item for a defined future time period. The online system generates, based on the estimated level of inventory and the demand prediction score, a depletion metric for the item indicative of a time period until the inventory of the item is depleted at the location of the retailer. The online system generates, based on the depletion metric, action data associated with one or more actions in relation to the inventory of the item. The online system communicates, to a computing system associated with the retailer via the network, the action data prompting the one or more actions in relation to the inventory of the item.

BRIEF DESCRIPTION OF THE DRAWINGS

FIG. 5 illustrates an example table with demand prediction scores and depletion metrics for a set of items as predicted by trained models of an online concierge system, in accordance with one or more embodiments.

FIG. 6 is a flowchart for a method of using a trained model of an online concierge system to generate an action recommendation for a retailer associated with the online concierge system by predicting a future demand for an item, in accordance with one or more embodiments.

DETAILED DESCRIPTION

Figure 1:
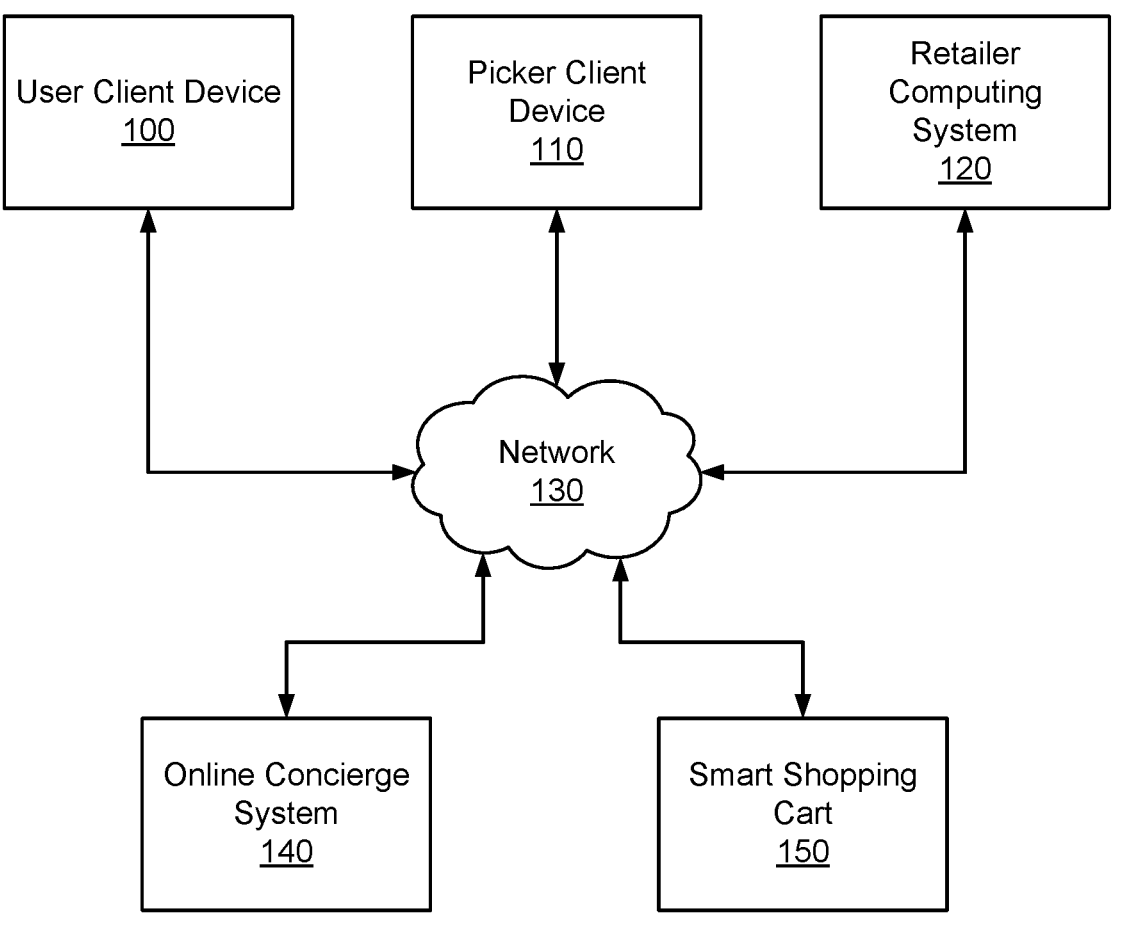
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, an online concierge system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 leverages data that obtains through its concierge service to provide inventory insights to retailers from which it uses to source order fulfillment. Currently, retailers maintain their own inventory which is flawed because they do not have real time feedback and cannot account for anticipated demand outside of historical purchases. The online concierge system 140 maintains an inventory prediction model (i.e., out-of-stock model) that estimates a current level of inventory and utilizes pickers to provide inventory-related input data to the inventory prediction model as well as to a demand prediction model that is trained predict a future demand for a specific item. Based on the predicted future demand, the online concierge system 140 triggers one or more actions in relation to the inventory management for the specific item.

The online concierge system 140 may utilize an inventory prediction model (e.g., machine-learning model) to predict a current inventory level of an item at a particular retail location, where the inventory prediction model uses inputs from the concierge service, such as online purchase data, in-store image data obtained via the smart shopping cart 150, and data gathered by picker client devices 110. The online concierge system 140 may then use the demand prediction model to predict a future demand for the item for one or more future time periods and then decrements the predicted current inventory level to thereby predict a depletion metric for the item indicative of a time period (e.g., number of days) until depletion of the item at the retail location would occur. The predicted depletion metric may be surfaced to the relater in various ways, such as an alert, an interface to a resupply system, a dashboard, etc. Hence, the online concierge system 140 presented herein utilizes predictive models to determine when a retailer's supply is likely to be low, and surface insights to the retailer for resupplying an inventory of a particular item.

The demand prediction model of the online concierge system 140 represents an inventory management tool for retailers which leverages unique input features (e.g., online purchases, outputs of the inventory prediction model, purchase data collected by pickers, data collected by in-store smart shopping carts 150, etc.) to predict future demands for specific items and determine when retailers' stock would be depleted. Leveraging online purchase data, prior replacements and/or outputs of the inventory prediction model to forecast future demands can allow retailers to reduce out-of-stock occurrences and proactively manage their inventories before items are actually out-of-stock and the retailer misses out on demand. The demand prediction model may output various information about items, such as their respective inventory shortages, so that the online concierge system 140 may notify retailers about which items they need to replenish and how much they should order. The online concierge system 140 is described in further detail below with regards to FIG. 2 and FIG. 4.

The smart shopping cart 150 is an in-store shopping cart that enables a user of the online concierge system 140 to physically add (i.e., place) items from a location of a retailer (e.g., store) into the smart shopping cart 150 and check the items out from the location of the retailer without an involvement of an employee of the retailer at the point of sale. The smart shopping cart 150 may be connected to the online concierge system 140 via the network 130. During the user's shopping session, the smart shopping cart 150 may utilize various sensors (e.g., one or more weight sensors, one or more cameras, etc.) to gather data about the user's activity, including, but not limited to, a location of the smart shopping cart 150 in the store, weight changes of the smart shopping cart 150 as items are added to or removed from the smart shopping cart 150, video of the user's activity in and around the smart shopping cart 150, video of shelves with items in the store, etc. Data gathered by various sensors of the smart shopping cart 150 may be utilized by the inventory prediction model and the demand prediction model of the online concierge system 140 to predict a depletion metric for a specific item that is indicative of a time period until the inventory of the item would be depleted at the store. In one or more embodiments, the smart shopping cart 150 is considered being a part of the online concierge system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
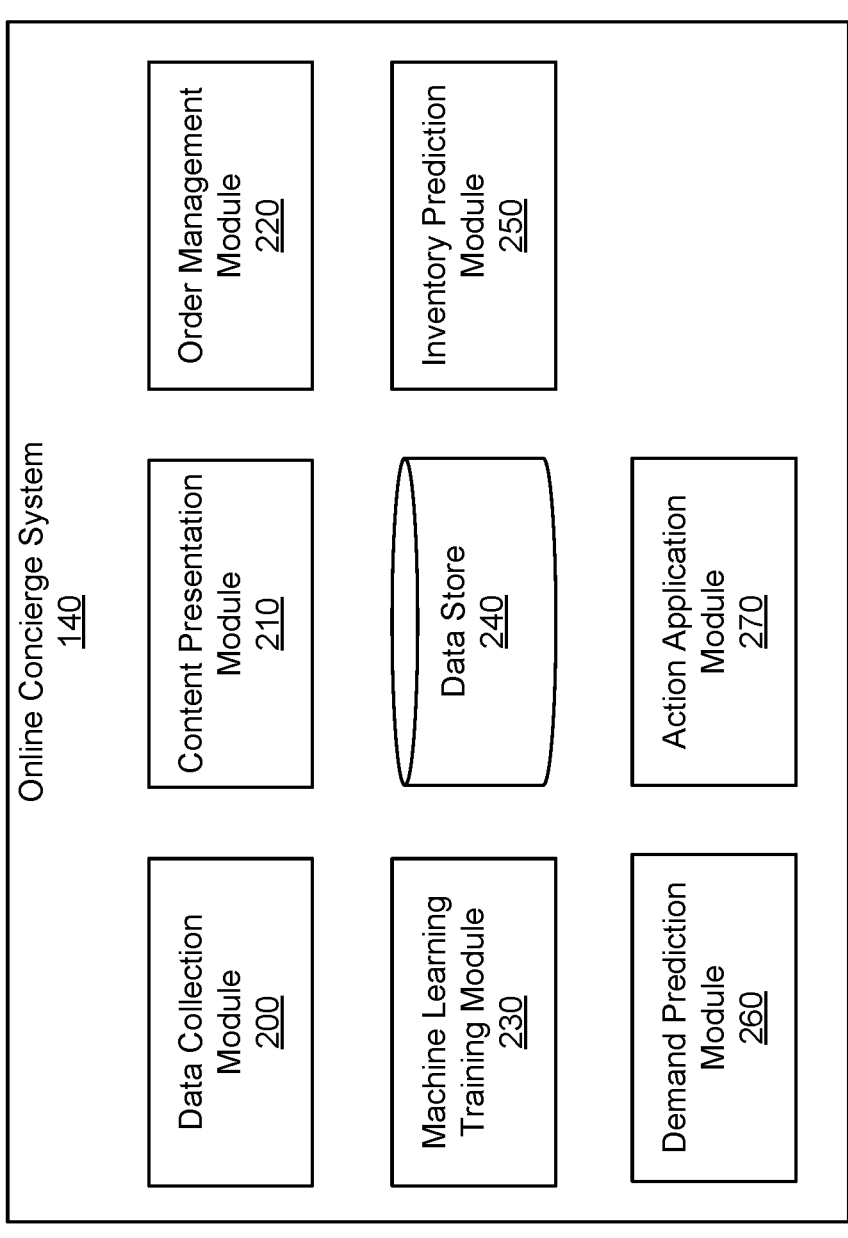
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, an inventory prediction module 250, a demand prediction module 260, and an action application module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The inventory prediction module 250 may estimate a current level of inventory (i.e., supply) for a given item at a location of a retailer (e.g., retail store) that is associated with the online concierge system 140. The inventory prediction module 250 may access an inventory prediction model (e.g., machine-learning model) that is trained to predict the current level of inventory for the item. Alternatively or additionally, the inventory prediction model may be trained to predict a future inventory for the item (i.e., the level of inventory for a defined time period in advance). The inventory prediction module 250 may deploy the inventory prediction model to run a machine-learning algorithm to output, based on a set of inputs, an estimated level of current inventory of the item. A set of parameters for the inventory prediction model may be stored at one or more non-transitory computer-readable media of the inventory prediction module 250. Alternatively, the set of parameters for the inventory prediction model may be stored at one or more non-transitory computer-readable media of the data store 240.

The inventory prediction module 250 may provide the set of inputs representing various input features to the inventory prediction model. In providing the set of inputs to the inventory prediction model, the inventory prediction module 250 may provide picker data with information about a replacement of an item that is missing at a location of a retailer or a refund in relation to the missing item applied by a picker who is at the location of the retailer fulfilling an online order placed by a user of the online concierge system 140. Thus, the picker may provide valuable inventory feedback for the inventory prediction model because the picker is physically present in the store and can confirm if items are in stock or out of stock. The inventory prediction module 250 may receive the picker data from the picker client device 110 via the network 130.

Alternatively or additionally, in providing the set of inputs to the inventory prediction model, the inventory prediction module 250 may provide visual data collected via the smart shopping cart 150 that a user of the online concierge system 140 while shopping at the location of the retailer. The collected visual data may show images of shelves and aisles at the location of the retailer that store different items and thus may be indicative of a current level of inventory for a specific item of interest. The inventory prediction module 250 may receive the visual data from the smart shopping cart 150 via the network 130.

Figure 3:
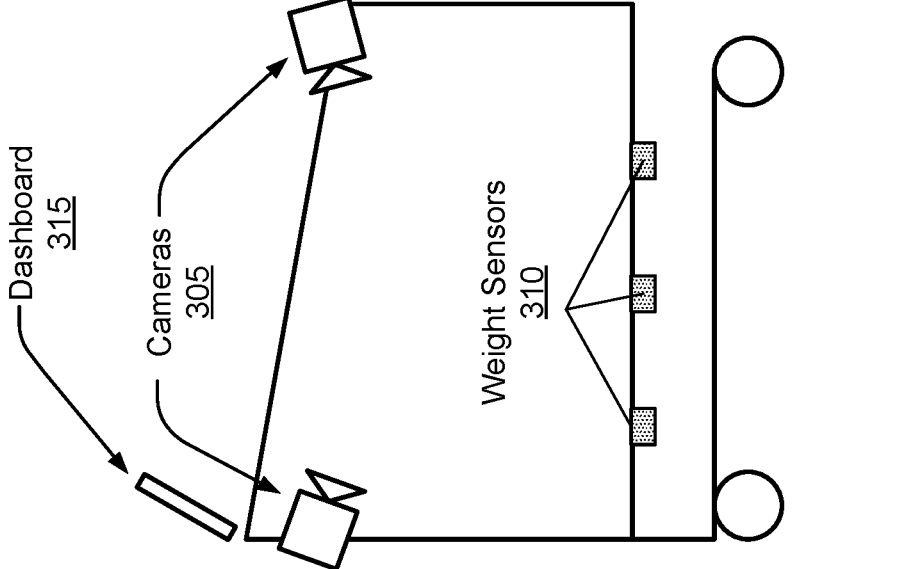
FIG. 3 illustrates an example smart shopping cart associated with an online concierge system, in accordance with one or more embodiments.

FIG. 3 illustrates an example smart shopping cart 150 associated with the online concierge system 140, in accordance with one or more embodiments. The smart shopping cart 150 may have one or more cameras 305 that collect video data and/or image data in relation to shelves (i.e., store aisles) with various stored items as a user that utilizes the smart shopping cart 150 for in-store shopping is passing by. The one or more cameras 305 may further collect video data and/or image data in relation to items placed in the smart shopping cart 150, such as a weight of each item as indicated in an item label, a brand of each item, a price of each item, etc. Additionally, the one or more cameras 305 may collect video data and/or image data in relation to actions in and around the smart shopping cart 150, such as a location of the smart shopping cart 150 in the store when a certain action occurs (e.g., when an item is added to the cart), user's gestures when placing items in the smart shopping cart 150, video and/or images of user's interactions with the smart shopping cart 150, track the location of the user within the store, etc. Alternatively or additionally, the smart shopping cart 150 may be equipped with one or more weight sensors 310 that measure weights of items placed in the smart shopping cart 150. The smart shopping cart 150 may further include a dashboard 315 that operates as a user interface that displays a list of items added to a receptacle of the smart shopping cart 150 and can be used for the checkout. The smart shopping cart 150 may include additional sensors not shown in FIG. 3. Data gathered by various sensors of the smart shopping cart 150 may be uploaded via the network 130 to the inventory prediction module 250 and/or the demand prediction module 260.

The demand prediction module 260 may determine a depletion metric for an item that is indicative of a time period until an inventory of the item is depleted at a location of a retailer associated with the online concierge system 140. The demand prediction module 260 may access a demand prediction model (e.g., machine-learning model) that is trained to predict a future demand for the item. The demand prediction module 260 may deploy the demand prediction model to run a machine-learning algorithm to output, based on a set of inputs, a demand prediction score for the item that is indicative of the future demand for the item for a defined future time period. The demand prediction module 260 may then determine the depletion metric for the item based on the estimated current level of inventory of the item (e.g., as determined by the inventory prediction model) and the demand prediction score for the item that is output by the demand prediction model. A set of parameters for the demand prediction model may be stored at one or more non-transitory computer-readable media of the demand prediction module 260. Alternatively, the set of parameters for the demand prediction model may be stored at one or more non-transitory computer-readable media of the data store 240.

The demand prediction module 260 may provide the set of inputs representing various input features to the demand prediction model that are suitable for predicting a future demand for a specific item. In providing the set of inputs to the demand prediction model, the demand prediction module 260 may provide an estimated current level of inventory for the specific item and/or an estimated future level of inventory for the specific item, e.g., as predicted by the inventory prediction model. Outputs of the inventory prediction model may be leveraged by the demand prediction model to identify items that are likely not satisfying their current demand. The outputs of the inventory prediction model may be provided to the demand prediction module 260 or directly passed to the demand prediction model.

In providing the set of inputs to the demand prediction model, the demand prediction module 260 may further provide in-store data gathered by pickers who are fulfilling online orders placed by users of the online concierge system 140 and/or by sensors of smart shopping carts 150 used for in-store shopping. The in-store data gathered by the pickers may include real time purchase data, such as data scanned by the picker client device 110 indicative of purchasing a specific item, real time found rates for the specific item, etc. The in-store data gathered by the pickers may further include information about replacements that the pickers perform in relation to an item that is missing at a location of a retailer, and/or refunds applied by the pickers in relation to the missing item. The in-store data gathered by the pickers may thus be leveraged to understand the frequency of items being purchased, where changes in expected behavior may indicate a low stock for a particular item. The demand prediction module 260 may receive in-store data gathered by the picker from the picker client device 110 via the network 130.

The cameras 305 and/or the weight sensors 310 of the smart shopping cart 150 may gather various in-store data indicative of a level of inventory for a specific item as well as of a level of demand for the specific item. For example, in-store shopping data collected by the smart shopping cart 150 can be leveraged to understand the frequency of items being purchased, where certain changes in expected behavior may indicate a low stock for the specific item. Visuals and scanning from the smart shopping cart 150 (e.g., as gathered by the cameras 305 and the weight sensors 310) as the smart shopping cart 150 passes by aisles in a retail store can be used to analyze any inventory gaps. The in-store data may be further collected by users of the online concierge system 140 who come in a store with shopping list features running on their user client devices 100 while also utilizing the smart shopping carts 150 for in-store shopping. For example, if they remove an item from their in-store shopping lists without putting the item in their smart shopping carts 150, this particular item may be out of stock. A lower weight may be applied to the in-store shopping list data as an individual user may have decided against purchasing this item as well. However, if a larger number of users remove the item from their in-store shopping lists, the gathered in-store shopping list data may represent a strong indication that the particular item is indeed out of stock.

Additionally, in-store location data gathered by the cameras 305 of the smart shopping cart 150 may be utilized to understand if a picker was in the correct aisle/shelf for an item when they flag the item as a missing item for the inventory prediction model. For example, if according to the in-store location data gathered by the cameras 305 of the smart shopping cart 150 the picker was likely in the incorrect aisle, the refund/replacement indicator would be weighted lower for the inventory prediction model and/or the demand prediction model. And, if according to the in-store location data gathered by the cameras 305 of the smart shopping cart 150 the picker was likely in the correct aisle, the refund/replacement indicator would be weighted higher for the inventory prediction model and/or the demand prediction model. The in-store located data collected using various sensors of the smart shopping cart 150 may be communicated via the network 130 to the inventory prediction module 250 and/or the demand prediction module 260.

In providing the set of inputs to the demand prediction model, the demand prediction module 260 may further provide various online purchase data. For example, the demand prediction module 260 may retrieve from the data store 240 historical purchase data for a specific item. The historical purchase data may be utilized by the demand prediction model to understand typical demand patterns and ensure that retailers have the inventory to support the historical demand patterns. This information can improve inventory management, as the demand prediction model may proactively determine inventory needs, prior to stock levels dropping. The demand prediction module 260 may further receive, from user client devices 100 via the network 130, current online purchase data with information about conversions by users of a specific item. The current online purchase data can inform the demand prediction model in real time about a possible inventory depletion for the specific item as the submitted online orders can be compared to an estimated inventory level for the specific item (e.g., as predicted by the inventory prediction computer mode). Essentially, the demand prediction model may predict when an inventory of an item would be depleted based on a current online order volume for this specific item. The current online purchase data may especially be useful if related to infrequently purchased items since the current online purchase data can efficiently supplement in-store transaction data. The current online purchase data that are related to seasonal and trending items may be utilized by the demand prediction model to predict demand spikes, which is beneficial to proactively order inventory.

An output of the demand prediction model may be a demand prediction score for a specific item that is indicative of a future demand for the item over a defined time period (e.g., day, weekend, workdays, one week, two weeks, etc.). For example, a higher value of the demand prediction score may be indicative of a predicted higher future demand for the item over the defined time period. The demand prediction module 260 may then compare the demand prediction score with an estimated current inventory level for the item (e.g., as predicted by the inventory prediction model) to determine a depletion metric for the item indicative of a time period (e.g., number of days) until the inventory of the item is depleted at a location of a retailer. In this manner, the demand prediction module 260 may compute a number of days until depletion of inventory for different items at the location of the retailer. Thus, for each defined future time period, the demand prediction module 260 may run the demand prediction model to predict demand for an item. By decrementing an estimated current level of inventory for the item (e.g., as predicted by the inventory prediction model) until zero using a demand prediction score for the item (e.g., as predicted by the demand prediction model), the demand prediction module 260 may determine a depletion metric for the item, e.g., "days until depletion" metric. Additionally, the demand prediction module 260 may identify a turnover time for a specific item. For example, for an item with expiration, it is desirable that the "days until depletion" metric be lower than the expiration time of the item.

The action application module 270 may generate, based on the depletion metric for the item, action data that trigger an action in relation to the inventory of the item. For example, when the depletion metric indicates that an inventory of the item would be depleted within a threshold number of days, the action application module 270 may generate a recommendation for a retailer to resupply the inventory along with a recommended quantity of the item for resupply. Additionally or alternatively, the action application module 270 may generate a "low supply alert" in order to alert the retailer about a need to resupply the inventory of the item. Additionally or alternatively, when a depletion metric for an item indicates that a number of days until depletion is actually higher than an expiration time of the item (e.g., due to a low demand for the item), the action application module 270 may generate an alert for a retailer about a likely expiration of the item. Additionally or alternatively, the action application module 270 may utilize an application programming interface (API) between the online concierge system 140 and the retailer computing system 120 to generate, based on a depletion metric for an item, an auto-order for a retailer for the item, or a modification of an existing resupply order for the item. The action application module 270 may communicate various resupply recommendations, orders and/or alerts to the retailer computing system 120 via the network 130. For example, upon receiving a "low supply" alert from the online concierge system 140, a dashboard of the retailer computing system 120 may display an alert for the retailer indicative of a need to resupply an inventory of an item.

The machine-learning training module 230 may perform initial training of the demand prediction model using training data. The machine-learning training module 230 may generate the training data by collecting information about a set of demands for an item by a first collection of users of the online concierge system 140 occurred over a defined time period (e.g., day, week, two weeks, etc.) given an initial set of inventories for the item. The machine-learning training module 230 may train the demand prediction model using the training data to generate initial values for the set of parameters of the demand prediction model.

Furthermore, the machine-learning training module 230 may collect feedback data with information about a conversion volume of an item by a collection of users of the online concierge system 140 upon a corresponding retailer performed a resupply action in relation to an inventory of the item in response to an action recommendation triggered based on a demand prediction score and depletion metric predicted by the demand prediction model. The machine-learning training module 230 may re-train the demand prediction model by updating the set of parameters of the demand prediction model using the collected feedback data. Additionally, the machine-learning training module 230 may re-train the inventory prediction model by updating, using information about a depletion metric for an item as determined by the demand prediction module 260, the set of parameters of the inventory prediction model.

Figure 4:
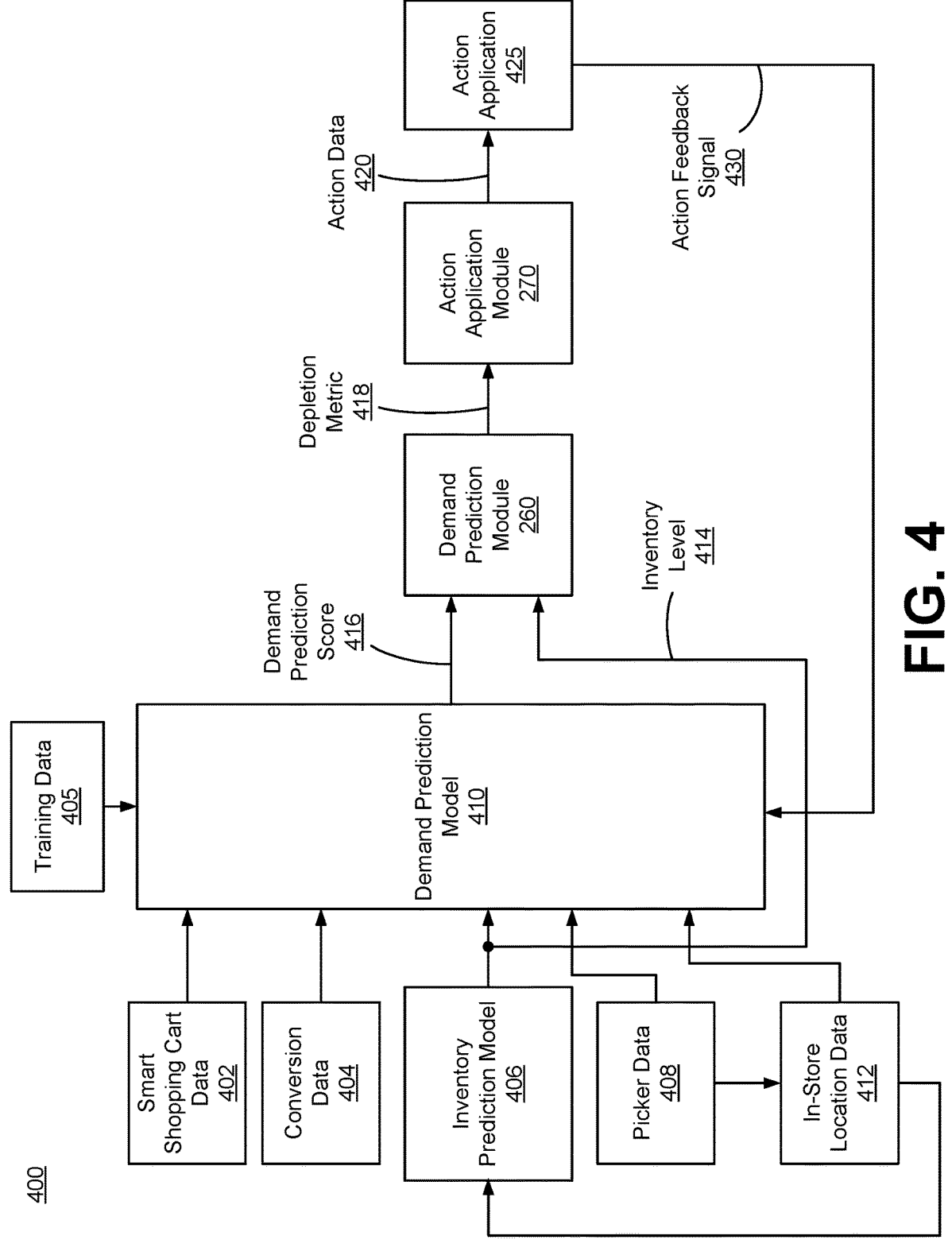
FIG. 4 illustrates an example architectural flow diagram of using trained models to generate an action recommendation for a retailer associated with an online concierge system by predicting a future demand for an item, in accordance with one or more embodiments.

FIG. 4 illustrates an example architectural flow diagram 400 of using a demand prediction model 410 to generate action recommendations for a retailer associated with the online concierge system 140 by predicting a future demand for an item, in accordance with one or more embodiments. First, the online concierge system 140 may perform (e.g., via the machine-learning training module 230) initial training of the demand prediction model 410 using training data 405 to generate initial values for the set of parameters of the metric prediction model 410. The training data 405 may be generated (e.g., via the machine-learning training module 230) by collecting information about a set of demands for an item achieved by a collection of users of the online concierge system 140 over a defined time period (e.g., day, week, two weeks, etc.) given an initial set of inventories for the item. After the training process is completed, the online concierge system 140 may provide various inputs to the demand prediction model 410 (e.g., via the demand prediction module 260), such as smart shopping cart data 402, conversion data 404, a predicted current (and/or future) inventory level 414 output by an inventory prediction model 406, a picker data 408, and/or instore location data 408. Some additional input features not shown in FIG. 4 suitable for predicting a future demand for an item may be further provided to the demand prediction model 410.

In providing the smart shopping cart data 402 to the demand prediction model 410, the online concierge system 140 may provide (e.g., via the demand prediction module 260) visual data (e.g., video and/or images) related to shelves and aisles with items at a location of a retailer collected by sensors of the smart shopping cart 150 and scanning data obtained via the sensors of the smart shopping cart 150 as items are added to a physical receptacle of the smart shopping cart 150. The smart shopping cart data 402 may be gathered via cameras and other sensors of the smart shopping cart 150 and provided via the network 130 to the online concierge system 140 and the demand prediction module 260.

In providing the conversion data 404 to the demand prediction model 410, the online concierge system 140 may provide (e.g., via the demand prediction module 260) data with information about historical purchases of an item, information about demand patterns for the item, and/or real time conversion data related to online purchases of the item by users of the online concierge system. The conversion data 404 with information about historical purchases and/or demand patterns for the item may be retrieved by the demand prediction module 260 from the data store 240. The conversion data 404 with real time information about a conversion volume for the item may be received at the demand prediction module 260 from user client devices 100 via the network 130.

In one or more embodiments, the inventory prediction model 406 provides information about the current (and/or future) inventory level 414 for the item at the location of the retailer. The inventory prediction model 406 may predict the inventory level 414 based on a set of inputs, such as data provided by pickers associated with the online concierge system 140 with information about an inventory of the item (e.g., replacements and/or refunds associated with the item as conducted by the pickers), visual information about an item's inventory (e.g., videos and/or images of shelves/ aisles with stored items), data provided by users of the online concierge system 140 with information about the inventory of the item (e.g., replacements and/or refunds associated with the item as received at the user client devices 100), some other data with information about a current level of inventory of the item, or some combination thereof.

In providing the picker data 408 to the demand prediction model 410, the online concierge system 140 may provide (e.g., via the demand prediction module 260) data with information about real time purchase data (e.g., prices of items as scanned by the pickers, real time found rates for the item, etc.), replacement/refund data in relation to the item missing at the location of the retailer, comments from the pickers in relation to an inventory of the item at the location of the retailer, etc. The picker data 408 may be received at the demand prediction module 260 from picker client devices 110 via the network 130. Additionally, the in-store location data 412 gathered by the cameras 305 of the smart shopping cart 150 may be utilized by the inventory prediction model 406 to understand if a picker was in the correct aisle/shelf for the item when they flagged the item as a missing item. If according to the in-store location data 412 the picker was in the incorrect aisle, a refund/replacement indicator that is as part of the picker data 408 provided to the inventory prediction model 406 is weighted lower. And, if according to the in-store location data 412 the picker was in the correct aisle, a refund/replacement indicator that is as part of the picker data 408 provided to the inventory prediction model 406 is weighted higher. In one or more embodiments, the in-store location data 412 is provided as additional input features to the demand prediction model 410.

The demand prediction model 410 may apply a machine-learning algorithm to the smart shopping data 402, the conversion data 404, the inventory level 414, the picker data 408, and/or the in-store location data 412 to output a demand prediction score 416 for the item that is indicative of a future demand for the item over a defined time period (e.g., day, weekend, workdays, one week, two weeks, etc.). A higher value of the demand prediction score 416 may be indicative of a predicted higher future demand for the item over the defined time period, and a lower value of the demand prediction score 416 may be indicative of a predicted lower future demand for the item over the defined time period. The demand prediction score 416 output by the demand prediction model 410 may be passed along with the inventory level 414 to the demand prediction module 260. The demand prediction module 260 may compare the demand prediction score 416 indicative of a future demand for the item with inventory level 414 of the item to determine a depletion metric 418 for the item. The depletion metric 418 may be indicative of a time period (e.g., number of days) until an inventory of the item would be depleted at a location of a retailer. The depletion metric 418 determined by the demand prediction module 260 may be passed to the action application module 270.

The action application module 270 may generate, based on the depletion metric 418, action data 420 that trigger one or more actions in relation to the inventory of the item, such as a recommendation for a retailer to resupply the inventory of the item along with a recommended resupply quantity, a "low supply alert" for the retailer, an alert about a likely expiration of the item, an auto-order for resupplying the inventory of the item, an automatic modification of existing resupply order, some other action, or some combination thereof. The action application module 270 may communicate various resupply recommendations and/or alerts triggered by the action data 420 to the retailer computing system 120 via the network 130. The one or more actions triggered by the action data 425 and performed by the retailer may be cumulatively performed as an action application 425.

The action application 425 may generate an action feedback signal 430 indicative of one or more results of the one or more actions performed by the retailer. For example, the action feedback signal 430 may include information about conversions of the item by a collection of users of the online concierge system 140 over a defined time period upon the retailer resupplied the inventory of the item in accordance with the depletion metric 418 and the action data 420. As the information about conversions of the item over the defined time period is indicative of a demand for the item over the defined time period, the action feedback signal 430 may be utilized (e.g., via the machine-learning training module 230) to re-train the demand prediction model 410. By utilizing the action feedback signal 430, the machine-learning training module 230 may improve the set of parameters of the demand prediction model 410 in order to continuously improve the machine-learning algorithm of the demand prediction model 410. Additionally, the action feedback signal 430 with information about the resupplied inventory of the item may be fed back as an updated input feature to the inventory prediction model 406 so that the inventory prediction model 406 can update its prediction about the inventory level 414.

FIG. 5 illustrates an example table 500 with demand prediction scores and depletion metrics for a set of items as predicted by a demand prediction model of the online concierge system 140 (e.g., the demand prediction model 410), in accordance with one or more embodiments. The table 500 shows example outputs of the demand prediction model for three different items, e.g., Item A, Item B, and Item C. An inventory prediction model of the online concierge system 140 (e.g., the inventory prediction model 406) may first predict a current inventory level for each of Item A, Item B, and Item C. For example, the predicted current inventory level for Item A is 20 quantities, the predicted current inventory level for Item B is 45 quantities, and the predicted current inventory level for Item C is 1000 quantities. After that, the demand prediction model may identify a demand prediction score for each of Item A, Item B, and Item C, which is indicative of what percentage of a particular item's inventory would be converted over a defined time period (e.g., day, two days, etc.). For example, the demand prediction score for Item A is the lowest and equals 10%, the demand prediction score for Item B is 75%, and the demand prediction score for Item C is the highest and equals 105% meaning the inventory of the Item C will likely be depleted over the defined time period.

The online concierge system 140 may then identify (e.g., via the demand prediction module 260) the depletion metric for each of Item A, Item B, and Item C, which is indicative of a number of days until depletion for a corresponding item. For example, the identified number of days until depletion for Item A is 10 days, the identified number of days until depletion for Item B is 3 days, and the identified number of days until depletion for Item C is 0 days. Based on the identified depletion metric for each of Item A, Item B, and Item C (e.g., number of days until depletion), the online concierge system 140 may trigger (e.g., via the action application module 270) an inventory purchase recommendation for a retailer for each of Item A, Item B, and Item C. For example, as the number of days until depletion for Item A is 10 days, which is higher than a predetermined threshold number of days for Item A, no inventory purchase recommendation is made for Item A. As the number of days until depletion for Item B is 3 days, which is lower than a predetermined threshold number of days for Item B, the inventory purchase recommendation is sent to the retailer along with a recommended quantity of Item B for resupply (e.g., 30 quantities of Item B). Similarly, as the number of days until depletion for Item C is 0 days, which is lower than a predetermined threshold number of days for Item C, the inventory purchase recommendation is sent to the retailer along with a recommended quantity of Item C for resupply (e.g., 500 quantities of Item C). The recommended quantity for resupply of a particular item may be set in advance for each item. Alternatively, the recommended quantity for resupply of a particular item may be dynamically adjusted based on a demand prediction score and/or a depletion metric for the particular item.

FIG. 6 is a flowchart for a method of using a trained model of an online concierge system to generate an action recommendation for a retailer associated with the online concierge system by predicting a future demand for an item, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., the online concierge system 140). Additionally, each of these steps may be performed automatically by the online concierge system without human intervention.

The online concierge system 140 gathers 605 (e.g., via the demand prediction module 260) in-store data by receiving, via a network (e.g., the network 130) from at least one of a device of a picker (e.g., the picker client device 110) associated with the online concierge system 140 or a computing system mounted to a physical receptacle (e.g., the smart shopping cart 150) utilized for shopping at a location of a retailer associated with the online concierge system 140, data with information about an inventory of an item at the location of the retailer. The online concierge system 140 may gather, via one or more cameras (e.g., the cameras 305) mounted to the physical receptacle, visual data related to one or more shelves storing the item at the location of the retailer. The online concierge system 140 may receive (e.g., at the demand prediction module 260) the visual data from the computing system mounted to the physical receptacle via the network. Alternatively or additionally, the online concierge system 140 may gather the in-store data by receiving, from the device of the picker via the network, scanning data with information about purchases of the item over a defined time period (e.g., hour, day, two days, etc.).

The online concierge system 140 obtains 610 (e.g., at the inventory prediction module 250 and/or the demand prediction module 260) conversion data with information about conversions of the item associated with a plurality of orders placed at the concierge system 140. The online concierge system 140 may obtain the conversion data by retrieving (e.g., via the inventory prediction module 250 and/or the demand prediction module 260), from a database of the online concierge system 140 (e.g., the data store 140), data with information about conversions of the item over a defined time period (e.g., day, week, two weeks, etc.). Alternatively or additionally, the online concierge system 140 may obtain the conversion data by receiving, from one or more devices associated with one or more users of the online concierge system 140 (e.g., user client devices 100) via the network, data with information about conversions of the item over a defined time period (e.g., hour, day, two days, etc.).

The online concierge system 140 estimates 615 (e.g., via the inventory prediction module 250), based at least in part on the conversion data, a level of inventory for the item at the location of the retailer. The online concierge system 140 may access an inventory prediction model of the online concierge system 140 (e.g., via the inventory prediction module 250), wherein the inventory prediction model is trained to predict the level of inventory of the item. The online concierge system 140 may apply the inventory prediction model (e.g., via the inventory prediction module 250) to predict, based at least in part on the conversion data, the estimated level of inventory of the item. In one or more embodiments, to estimate the level of inventory, the online concierge system 140 gathers, via one or more cameras mounted to the physical receptacle (e.g., via the cameras 305 of the smart shopping cart 150), visual data related to one or more shelves storing the item at the location of the retailer. In such cases, the online concierge system 140 may apply the inventory prediction model (e.g., via the inventory prediction module 250) to predict, based on the conversion data and the visual data, the estimated level of inventory of the item. Additionally or alternatively, the online concierge system 140 may receive (e.g., at the inventory prediction module 250), from the device of the picker via the network, picker data with information about at least one of one or more replacements of the item or one or more refunds in relation to the item. The online concierge system 140 may estimate (e.g., by applying the inventory prediction model), further based on the received picker data, the level of inventory for the item.

The online concierge system 140 accesses 620 a demand prediction model of the online concierge system 140 (e.g., via the demand prediction module 260), wherein the demand prediction model is trained to predict a future demand for the item. The online concierge system 140 applies 625 the demand prediction model (e.g., via the demand prediction module 260) to predict, based on the in-store data, the conversion data and the estimated level of inventory, a demand prediction score for the item indicative of the future demand for the item for a defined future time period (e.g., one day, two days, one week, etc.).

The online concierge system 140 generates 630 (e.g., via the demand prediction module 260), based on the estimated level of inventory and the demand prediction score, a depletion metric for the item indicative of a time period until the inventory of the item is depleted at the location of the retailer. The online concierge system 140 may re-train (e.g., via the machine-learning model 230) the inventory prediction model by updating, using the depletion metric, a set of parameters of the inventory prediction model.

The online concierge system 140 generates 635 (e.g., via the action application module 270), based on the depletion metric, action data associated with one or more actions in relation to the inventory of the item. The online concierge system 140 communicates 640 (e.g., via the action application module 270), to a computing system associated with the retailer (e.g., the retailer computing system 120) via the network, the action data prompting the one or more actions in relation to the inventory of the item. The online concierge system 140 may communicate the action data by communicating (e.g., via the action application module 270), to the computing system associated with the retailer via the network, a command that triggers an auto-order at the computing system associated with the retailer for resupplying the inventory of the item. Alternatively, the online concierge system 140 may communicate the action data by communicating (e.g., via the action application module 270), to the computing system associated with the retailer via the network, an alert message about a depletion of the inventory of the item within the time period prompting the retailer to resupply the inventory of the item.

The online concierge system 140 may generate (e.g., via the machine-learning model 230) training data by collecting information about a set of demands for the item achieved by a first collection of users of the online concierge system 140 over a defined time period (e.g., day, week, two weeks, etc.) given a set of inventories for the item. The online concierge system 140 may train (e.g., via the machine-learning training module 230) the demand prediction model using the training data to generate a set of initial values for a set of parameters of the demand prediction model. The online concierge system 140 may further collect (e.g., via the machine-learning training module 230) feedback data with information about conversions of the item by a second collection of users of the online concierge system 140 upon the retailer performed an action in relation to the inventory of the item in response to the action recommendation. The online concierge system 140 may re-train (e.g., via the machine-learning training module 230) the demand prediction model by updating, using the collected feedback data, the set of parameters of the demand prediction model.

Embodiments of the present disclosure are directed to the online concierge system 140 that uses a trained model to predict a future demand for a specific item. The trained model utilizes various sources of data as input features, such as inventory related data provided by pickers via picker client devices 110, in-store data gathered by sensors of the smart shopping carts 150, online purchase data received from user client devices 100, etc. Insights about days until depletion for the item determined based on a current level of inventory of the item and the predicted future demand for the item are then surfaced to a retailer associated with the online concierge system 140 prompting the retailer to perform a resupply action in relation to the inventory of the item.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

gathering, via cameras of a smart shopping cart at a location of a retailer, in-store data including visual data that represent images of shelves and aisles at the location of the retailer indicative of a current inventory of an item at the location of the retailer;

receiving, via a network and from the smart shopping cart utilized for shopping at the location of the retailer, the in-store data with information about the current inventory of the item at the location of the retailer;

obtaining conversion data by receiving, by an order management module of the computer system via the network and from a plurality of devices associated with a plurality of users of an online system, real time information about conversions of the item associated with a plurality of orders placed by the plurality of users;

estimating, by an inventory prediction module of the computer system and based at least in part on the conversion data, a level of inventory for the item at the location of the retailer;

accessing, by a demand prediction module of the computer system, a demand prediction model, wherein the demand prediction model is a machine-learning model trained to predict a future demand for the item;

applying the demand prediction model to the in-store data, the conversion data and the level of inventory to generate a demand prediction score for the item indicative of the future demand for the item for a defined future time period;

generating, using the level of inventory and the demand prediction score, a depletion metric for the item indicative of a time period until the inventory of the item is depleted at the location of the retailer;

generating, using the depletion metric, action data associated with one or more actions in relation to the inventory of the item; and communicating, from an action application module of the computer system via the network and to a computing system associated with the retailer, the action data prompting the one or more actions in relation to the inventory of the item.

2. The method of claim 1, wherein gathering the in-store data further comprises:

receiving, via the network and from a device associated with a picker, scanning data with information about purchases of the item over a defined time period.

3. The method of claim 1, wherein estimating the level of inventory for the item further comprises:

receiving, via the network and from a device associated with a picker, picker data with information about at least one of one or more replacements of the item or one or more refunds in relation to the item; and estimating, further based on the picker data, the level of inventory for the item.

4. The method of claim 1, wherein obtaining the conversion data further comprises:

retrieving, from a database of the online system, data with information about conversion of the item over a defined time period.

5. The method of claim 1, wherein obtaining the conversion data comprises:

receiving, via the network and from one or more devices associated with one or more users of the online system, data with information about conversions of the item over a defined time period.

6. The method of claim 1, wherein estimating the level of inventory comprises:

accessing an inventory prediction model, wherein the inventory prediction model is a machine-learning model trained to predict the level of inventory of the item; and applying the inventory prediction model to the conversion data to predict the level of inventory of the item.

7. The method of claim 1, wherein estimating the level of inventory comprises:

accessing an inventory prediction model, wherein the inventory prediction model is a machine-learning model trained to predict the level of inventory of the item; and applying the inventory prediction model to the conversion data and the in-store data to predict the level of inventory of the item.

8. The method of claim 7, further comprising:

re-training the inventory prediction model by updating, using the depletion metric, a set of parameters of the inventory prediction model.

9. The method of claim 1, further comprising:

generating training data by collecting information about a set of demands for the item achieved by a first collection of users of the online system over a defined time period given a set of inventories for the item;

training the demand prediction model using the training data to generate a set of initial values for a set of parameters of the demand prediction model;

collecting feedback data with information about conversions of the item by a second collection of users of the online system upon the retailer performed an action in relation to the inventory of the item in response to the action data; and re-training the demand prediction model by updating, using the feedback data, the set of parameters of the demand prediction model.

10. The method of claim 1, wherein communicating the action data comprises:

communicating, via the network and to the computing system, a command that triggers an auto-order at the computing system for resupplying the inventory of the item.

11. The method of claim 1, wherein communicating the action data comprises:

communicating, via the network and to the computing system, an alert message about a depletion of the inventory of the item within the time period prompting the retailer to resupply the inventory of the item.

12. A computer program product comprising a non-transitory computer readable storage medium having instructions encoded thereon that, when executed by a processor, cause the processor to perform steps comprising:

gathering, via cameras of a smart shopping cart at a location of a retailer, in-store data including visual data that represent images of shelves and aisles at the location of the retailer indicative of a current inventory of an item at the location of the retailer;

receiving, via a network and from the smart shopping cart utilized for shopping at the location of the retailer, the in-store data with information about the current inventory of the item at the location of the retailer;

obtaining conversion data by receiving, by an order management module of a computer system via the network and from a plurality of devices associated with a plurality of users of an online system, real time information about conversions of the item associated with a plurality of orders placed by the plurality of users;

estimating, by an inventory prediction module of the computer system and based at least in part on the conversion data, a level of inventory for the item at the location of the retailer;

accessing, by a demand prediction module of the computer system, a demand prediction model, wherein the demand prediction model is a machine-learning model trained to predict a future demand for the item;

applying the demand prediction model to the in-store data, the conversion data and the level of inventory to generate a demand prediction score for the item indicative of the future demand for the item for a defined future time period;

generating, using the level of inventory and the demand prediction score, a depletion metric for the item indicative of a time period until the inventory of the item is depleted at the location of the retailer;

generating, using the depletion metric, action data associated with one or more actions in relation to the inventory of the item; and communicating, from an action application module of the computer system via the network and to a computing system associated with the retailer, the action data prompting the one or more actions in relation to the inventory of the item.

13. The computer program product of claim 12, wherein the instructions further cause the processor to perform steps comprising:

gathering the in-store data further by receiving, via the network and from a device associated with a picker, data with information about at least one of one or more replacements of the item or one or more refunds in relation to the item; and gathering the in-store data further by receiving, via the network and from the device associated with the picker, scanning data with information about purchases of the item over a defined time period.

14. The computer program product of claim 12, wherein the instructions further cause the processor to perform steps comprising:

obtaining the conversion data by further retrieving, from a database of the online system, data with information about conversions of the item over a defined time period.

15. The computer program product of claim 12, wherein the instructions further cause the processor to perform steps comprising:

accessing an inventory prediction model, wherein the inventory prediction model is a machine-learning model trained to predict the level of inventory of the item; and applying the inventory prediction model to the conversion data to predict the level of inventory of the item.

16. The computer program product of claim 12, wherein the instructions further cause the processor to perform steps comprising:

accessing an inventory prediction model, wherein the inventory prediction model is a machine-learning model trained to predict the level of inventory of the item; and applying the inventory prediction model to the conversion data and the in-store data to predict the level of inventory of the item.

17. The computer program product of claim 12, wherein the instructions further cause the processor to perform steps comprising:

generating training data by collecting information about a set of demands for the item achieved by a first collection of users of the online system over a defined time period given a set of inventories for the item;

training the demand prediction model using the training data to generate a set of initial values for a set of parameters of the demand prediction model;

collecting feedback data with information about conversions of the item by a second collection of users of the online system upon the retailer performed an action in relation to the inventory of the item in response to the action data; and re-training the demand prediction model by updating, using the feedback data, the set of parameters of the demand prediction model.

18. The computer program product of claim 12, wherein the instructions further cause the processor to perform steps comprising:

communicating the action data by communicating, via the network and to the computing system, an alert message about a depletion of the inventory of the item within the time period prompting the retailer to resupply the inventory of the item.

19. A computer system comprising:

a processor; and a non-transitory computer-readable storage medium having instructions that, when executed by the processor, cause the computer system to perform steps comprising:

gathering, via cameras of a smart shopping cart at a location of a retailer, in-store data including visual data that represent images of shelves and aisles at the location of the retailer indicative of a current inventory of an item at the location of the retailer;

receiving, via a network and from the smart shopping cart utilized for shopping at the location of the retailer, the in-store data with information about the current inventory of the item at the location of the retailer;

obtaining conversion data by receiving, by an order management module of the computer system via the network and from a plurality of devices associated with a plurality of users of an online system, real time information about conversions of the item associated with a plurality of orders placed by the plurality of users;

estimating, by an inventory prediction module of the computer system and based at least in part on the conversion data, a level of inventory for the item at the location of the retailer;

accessing, by a demand prediction module of the computer system, a demand prediction model, wherein the demand prediction model is a machine-learning model trained to predict a future demand for the item;

applying the demand prediction model to the in-store data, the conversion data and the level of inventory to generate a demand prediction score for the item indicative of the future demand for the item for a defined future time period;

generating, using the level of inventory and the demand prediction score, a depletion metric for the item indicative of a time period until the inventory of the item is depleted at the location of the retailer;

generating, using the depletion metric, action data associated with one or more actions in relation to the inventory of the item; and communicating, from an action application module of the computer system via the network and to a computing system associated with the retailer, the action data prompting the one or more actions in relation to the inventory of the item.

\* \* \* \* \*